(12) United States Patent
Fisher

(10) Patent No.: US 9,061,222 B2
(45) Date of Patent: Jun. 23, 2015

(54) FLUID FILTRATION APPARATUS AND METHOD

(75) Inventor: Greg Fisher, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 260 days.

(21) Appl. No.: 12/493,037

(22) Filed: Jun. 26, 2009

(65) Prior Publication Data

US 2009/0261029 A1 Oct. 22, 2009

Related U.S. Application Data

(62) Division of application No. 10/845,448, filed on May 13, 2004, now abandoned.

(51) Int. Cl.
*B01D 35/30* (2006.01)
*B01D 27/10* (2006.01)
*B01D 27/08* (2006.01)

(52) U.S. Cl.
CPC ...... *B01D 27/108* (2013.01); *B01D 2201/0461* (2013.01); *B01D 2201/291* (2013.01); *B01D 35/30* (2013.01); *B01D 27/08* (2013.01); *Y10S 210/17* (2013.01)

(58) Field of Classification Search
CPC .................................................. B01D 2201/29
See application file for complete search history.

(56) References Cited

U.S. PATENT DOCUMENTS

| | | | |
|---|---|---|---|
| 1,033,858 A | 7/1912 | Adams | |
| 1,647,799 A | 11/1927 | Hammer | |
| 2,646,886 A | 7/1953 | Le Clair | |
| 2,743,019 A | 4/1956 | Kovacs | |
| 2,843,268 A | 7/1958 | Kennedy | |
| 3,000,506 A | 9/1961 | Hultgren | |
| 3,132,097 A | 5/1964 | Tietz | |
| 3,204,771 A | 9/1965 | Baldwin | |
| 3,231,089 A | 1/1966 | Thornton | |
| 3,586,171 A | 6/1971 | Offer | |

(Continued)

FOREIGN PATENT DOCUMENTS

| | | |
|---|---|---|
| EP | 0 341 349 | 11/1989 |
| FR | 1165203 | 10/1958 |

(Continued)

OTHER PUBLICATIONS

*HMK03 Fluid Filter High Pressure*; Product bulletin of Donaldson Company, Inc.; Bulletin No. 1200-479 (Rev Mar. 1992);copyright 1992; 4 pages (not numbered).

*Primary Examiner* — Terry Cecil
(74) *Attorney, Agent, or Firm* — Leydig, Voit & Mayer, Ltd.

(57) ABSTRACT

An apparatus and method for filtering a liquid utilize a filter apparatus including a bypass filter, a full flow filter, and a flow balancing element for dividing a total inlet flow of fluid to the filter apparatus into a bypass portion, passing through the bypass filter, and a full flow portion, passing through the full flow filter. The bypass filter has a lower filtering efficiency than the full flow filter element, so that a venturi tube is not required for causing the bypass portion to pass through the bypass filter. The flow balancing element divides the flow into a desired bypass portion and a desired full flow portion, at a predetermined operating temperature. Below the operating temperature, the bypass portion increases and the full flow portion decreases, the bypass portion becoming greater than the full flow portion at a second predetermined temperature below the operating temperature.

30 Claims, 4 Drawing Sheets

(56) References Cited

U.S. PATENT DOCUMENTS

| | | | |
|---|---|---|---|
| 3,719,281 | A | 3/1973 | Dieringer |
| 3,859,216 | A | 1/1975 | Sisson et al. |
| 4,038,189 | A | 7/1977 | Dison et al. |
| 4,052,307 | A | 10/1977 | Humbert, Jr. |
| 4,655,914 | A | 4/1987 | Wada |
| 4,738,776 | A | 4/1988 | Brown |
| 4,740,299 | A | 4/1988 | Popoff et al. |
| 4,832,844 | A | 5/1989 | Ayers |
| 4,839,037 | A | 6/1989 | Bertelsen et al. |
| 4,841,628 | A | 6/1989 | Nagle |
| 4,855,047 | A | 8/1989 | Firth |
| 4,885,082 | A | 12/1989 | Cantoni |
| 4,992,166 | A | 2/1991 | Lowsky et al. |
| 5,082,561 | A | 1/1992 | LePierre |
| 5,104,537 | A | 4/1992 | Stifelman et al. |
| 5,118,417 | A | 6/1992 | Deibel |
| 5,171,430 | A | 12/1992 | Beach et al. |
| 5,256,285 | A | 10/1993 | Tomita et al. |
| 5,300,223 | A | 4/1994 | Wright |
| 5,301,958 | A | 4/1994 | Covington |
| 5,302,284 | A | 4/1994 | Zeiner et al. |
| 5,342,511 | A | 8/1994 | Brown et al. |
| 5,342,519 | A | 8/1994 | Friedmann et al. |
| 5,362,390 | A | 11/1994 | Widenhoefer et al. |
| 5,390,701 | A | 2/1995 | Lessley et al. |
| 5,395,518 | A | 3/1995 | Gulsvig |
| 5,445,734 | A | 8/1995 | Chen |
| 5,453,195 | A * | 9/1995 | Jorgenson et al. ............. 210/444 |
| 5,489,384 | A | 2/1996 | Janik et al. |
| 5,490,930 | A * | 2/1996 | Krull .............................. 210/443 |
| 5,525,226 | A | 6/1996 | Brown et al. |
| 5,548,893 | A | 8/1996 | Koelfgen |
| 5,679,244 | A | 10/1997 | Tettman et al. |
| 5,885,447 | A | 3/1999 | Theisen et al. |
| 5,904,357 | A | 5/1999 | Demirdogen et al. |
| 5,906,736 | A | 5/1999 | Bounnakhorn et al. |
| 6,478,958 | B1 | 11/2002 | Beard et al. |
| 6,554,140 | B2 * | 4/2003 | Steger et al. .................. 210/438 |
| 6,761,822 | B1 | 7/2004 | Rhyne et al. |
| 6,969,461 | B2 | 11/2005 | Beard et al. |
| 7,132,047 | B2 | 11/2006 | Beard et al. |

FOREIGN PATENT DOCUMENTS

| | | |
|---|---|---|
| GB | 561987 | 6/1944 |
| GB | 860871 | 2/1961 |
| GB | 2 220 866 | 1/1990 |
| IT | 573427 | 2/1958 |
| IT | 593874 | 5/1959 |
| SE | 213194 | 10/1966 |
| WO | WO 2004/033067 | 4/2004 |

* cited by examiner

FLUID FILTRATION APPARATUS AND METHOD

RELATED APPLICATION

This application is a divisional application of pending U.S. patent application Ser. No. 10/845,448 filed on May 13, 2004, which is incorporated by reference herein in its entirety.

FIELD OF THE INVENTION

This invention relates to an apparatus and method for filtering impurities from liquids, such as lubricating oil, hydraulic fluid and the like. More particularly, the invention relates to filtering impurities using a spin-on filter adapted to thread onto a filter mounting adaptor of, for example, a hydraulic system or a lubricating system.

BACKGROUND OF THE INVENTION

A spin-on filter is designed for a specified service life. The filter is then discarded and replaced with a new filter. Typically, more than one manufacturer produces filters which are interchangeable. As a disposable or throw-away type of item, the decision to purchase one brand of filter over a different brand is often based substantially on the price of the filter, and how often it must be replaced. For filters providing lubrication oil to an engine which will need to be started at cold ambient temperatures, it is also important to select a filter that has a low flow resistance during cold start conditions, so that an adequate flow of filtered lubricant can be supplied while the engine is coming up to operating temperature.

In order to provide a high overall filtering efficiency of the filter, it is a common practice to incorporate two separate filtering elements within a common housing of the spin-on filter. Typically, one of these filters, known as the full flow filter, is used for filtering all or most of the fluid passing through the housing of the filter. The other filter element, known in the industry as a bypass filter, is used for performing additional filtration of a small portion, typically about 10 percent, of the fluid passing through the housing.

In prior filters of this type, the full flow filter generally includes a full flow filter media having a rated efficiency for removing particles of a given size from the fluid passing through the full flow filter, and the bypass filter includes a bypass filter media having a higher rated efficiency for removing particles of the given size. Stated another way, the bypass filter media is essentially denser than the full flow filter media, making it capable of removing a higher percentage of particles of the given size from the smaller portion of fluid passing through the bypass filter. Theoretically, as the fluid is continuously circulated through the spin-on filter, in sequential passes through the filter housing, all of the fluid will eventually pass through the higher efficiency media of the bypass filter to receive additional filtration.

Typically, prior filters of this type have included a venturi tube that is used to locally reduce the pressure in the fluid, at a strategic point within the housing, to aid in pulling a small portion (about 10%) of the fluid through the relatively dense bypass filter. The reduced pressure is created by directing most of the fluid flowing through the housing through a throat in the venturi tube, to thereby accelerate the fluid at the throat of the venturi tube. This acceleration of the fluid causes the fluid pressure at the throat of the venturi tube to drop, due to well known principles of fluid dynamics.

In one prior approach to providing such a spin-on filter, the full flow and bypass filters are arranged in a parallel flow relationship to one another, with the flow through the full flow filter being accelerated in the venturi tube for dropping the pressure, in such a manner that a small portion of the total flow through the filter housing is induced to flow through the relatively dense bypass filter, rather than taking the path of lower resistance through the full flow filter. The small portion of fluid passing through the bypass filter is then reunited with the larger portion of fluid that was directed through the throat of the venturi tube, and the combined flow is returned to the system through the outlet of the spin-on filter. With this arrangement, the portion of the fluid receiving higher efficiency filtration in the bypass filter bypasses the full flow filter on that particular pass through the spin-on filter. This general approach is disclosed in U.S. Pat. No. 5,906,736 to Bounnakhom, et al.

In another prior approach, the bypass filter is disposed within the filter housing in such a manner that all fluid passing through the housing of the spin-on filter, on a given pass, is first filtered by full flow filter. The filtered fluid then splits, with a larger portion being routed through the throat of a venturi tube, which is arranged for drawing a small portion of the fluid filtered by the full flow filter, on that particular pass, through a higher efficiency bypass filter element, to thereby provide a second stage of filtering for the small portion of fluid passing through both the full flow and bypass filters. This approach is disclosed in U.S. Pat. No. 6,478,958, to Beard, et al., which is assigned to the assignees of the present invention.

Although prior filters, using venturi tubes to draw a small percentage of the total fluid being filtered through a higher efficiency bypass filter, generally work well for their intended purpose, certain drawbacks have been noted. Only a small percentage of the total fluid flow is routed through the higher efficiency bypass filter on each pass of the fluid through the filter. It can thus take some time before all of the fluid passes through the bypass filter. Such filters often exhibit fairly high resistance to fluid flow through the filter during cold start operation. It has been noted that the media in such filters tends to capture contaminant particles in a non-uniform manner, which tends to reduce the amount of contaminant that the filter can remove and hold, before the pressure drop through the filter apparatus rises to a point that the filter should be replaced. The complexity of such filters also tends to undesirably drive up the cost of production and the price of the filter apparatus.

It is desirable, therefore to provide an improved apparatus and method for fluid filtration that overcomes one or more of the drawbacks cited above, or other drawbacks, problems or deficiencies in prior art filters of the type addressed by the invention.

BRIEF SUMMARY OF THE INVENTION

The invention provides an improved apparatus and method for filtering a liquid, in a filter apparatus including a bypass filter and a full flow filter. In contrast to prior filter apparatuses of this type, however, the bypass filter of the present invention has a lower filtering efficiency for a particle of a given size than the full flow filter element, and a venturi tube is not required.

A filter apparatus according to the invention may also include a flow balancing element for dividing a total inlet flow of fluid to the filter apparatus into a bypass portion, passing through the bypass filter, and a full flow portion, passing through the full flow filter. Because the bypass filter, in a filter apparatus according to the invention, has a lower filtering efficiency than the full flow filter element, a venturi tube is not required, as was the case in prior filter apparatuses, for causing the bypass portion to pass through the bypass filter. The flow balancing element causes the total inlet flow to divide into the desired bypass portion and the desired full flow portion, at a predetermined operating temperature. When the filter apparatus is operating at temperatures which are lower than the operating temperature, the bypass portion increases and the full flow portion decreases. In some forms of the invention, the bypass portion ultimately becomes greater that the full flow portion at a second predetermined temperature below the operating temperature.

In one form of the invention, a filter apparatus includes a housing, a bypass filter, and a full flow filter. The housing has a closed end and an open end, joined by a cylindrical sidewall defining a longitudinal axis extending from the closed end to the open end of the housing.

The bypass filter is disposed within the housing adjacent the open end of the housing, and includes an outer periphery thereof, spaced inward from the sidewall of the housing to form a space around the bypass filter for passage of fluid between the bypass filter and the sidewall. The bypass filter also includes an inner periphery thereof, which forms an axially oriented through-bore of the bypass filter. The bypass filter further includes a bypass filter media, which is disposed between the inner and outer peripheries of the bypass filter. The, bypass filter media has a bypass filter efficiency, for removing particles of a given size from a fluid flowing radially inward through the bypass filter media from the space around the bypass filter to the through-bore of the bypass filter.

The full flow filter is disposed within the housing, adjacent the closed end of the housing, and includes an outer periphery thereof spaced inward from the sidewall of the housing to form a space around the full flow filter for passage of fluid between the full flow filter and the sidewall. The space between the full flow filter and the sidewall is connected in sealed fluid communication with the space between the bypass filter and the sidewall. The full flow filter also includes an inner periphery thereof, forming an axially oriented through-bore of the full flow filter, which is connected in sealed fluid communication with the through-bore of the bypass filter. The full flow filter further includes a full flow filter media, disposed between the inner and outer peripheries of the bypass filter.

The full flow filter has a full flow filter efficiency, for removing particles of the given size from a fluid flowing radially inward through the full flow filter media from the annular space around the full flow filter to the through-bore of the full flow filter, which is generally higher than the bypass filter efficiency for removing particles of the given size.

A filter apparatus, according to the invention, may also include a flow balancing element disposed in the through-bore of the bypass filter.

In one form of the invention, a filter apparatus, having a filter inlet and a filter outlet, includes a flow balancing element, a housing, a bypass filter, a full flow filter, and a flow balancing element. The bypass filter includes a bypass filter media, having a bypass filter efficiency for removing a particle of a given size. The full flow filter includes a full flow filter media, having a full flow filter efficiency for removing a particle of a given size, with the full flow efficiency being higher than the bypass filter efficiency. The bypass filter and full flow filters each have a respective fluid inlet connected to one another in a parallel circuit relationship by the housing.

The bypass filter and full flow filters each also have a respective fluid outlet connected to the flow balancing element. The flow balancing element has a full flow inlet, a bypass inlet, and an outlet, all connected to one another within the flow balancing element. The full flow inlet of the flow balancer is connected in fluid communication, in a series fluid circuit relationship, with the outlet of the full flow filter, and the bypass inlet of the flow balancer is connected in fluid communication in a series fluid circuit relationship with the outlet of the bypass filter. The outlet of the flow balancer is connected to the outlet of the filter apparatus.

The bypass flow inlet of the flow balancing element defines an equivalent bypass flow restricting orifice, which is sized to restrict the flow through the bypass filter media to a desired bypass flow portion of a total inlet flow of fluid entering the filter inlet of the filter apparatus. The flow balancing element may also include a full flow restrictor that is sized to restrict the flow through the full flow media to a desired full flow portion of the total inlet flow of fluid to the filter apparatus. The equivalent bypass flow restricting orifice, and the full flow restrictor, may be sized to allow a larger portion of the inlet flow to pass through the bypass filter when the fluid is below a predetermined operating temperature of the filter apparatus, and to restrict the flow through the bypass filter to a smaller portion of the inlet flow fluid at the predetermined operating temperature of the filter apparatus.

In one form of the invention, the full flow restrictor, full flow media, equivalent bypass orifice, and bypass filter media are cooperatively configured in such a manner that, at the operating temperature, the flow of fluid through the full flow filter will be larger than the flow of fluid through the bypass filter, and at a predetermined temperature below the operating temperature, the flow of fluid through the bypass filter will be larger than the flow of fluid through the full flow filter. Because the bypass filter media is less restrictive than the full flow filter media, this configuration results in less pressure drop through the filter apparatus, in comparison to prior filter apparatuses, during periods where the fluid is relatively cold, such as when an engine is first started and the engine lubricating oil has not yet come up to operating temperature.

In some forms of the invention, the full flow filter includes a lower end plate thereof, which is located adjacent to the closed end of the housing and extends generally from the outer periphery to the inner periphery of the full flow filter. The lower end plate of the full flow filter also includes an imperforate section thereof, which blocks fluid flow from entering the through-bore of the full flow filter. The full flow filter also includes an upper end plate thereof, adjacent the bypass filter, extending generally inward from the outer periphery of the full flow filter, and defining an outlet of the through-bore of the full flow filter.

The bypass filter includes a lower end plate thereof, adjacent the upper end plate of the full flow filter, extending generally inward from the outer periphery of the bypass filter, and defining a full flow inlet of the bypass filter in sealed fluid communication with the through-bore of the bypass filter. The bypass filter also includes an upper end plate thereof, adjacent the open end of the housing, extending generally inward from the outer periphery of the bypass filter, and defining an outlet of the through-bore of the bypass filter. The outlet of the full flow filter is sealingly connected to the full flow inlet of the bypass filter.

The flow balancing element includes a generally imperforate wall thereof, spaced from the inner periphery of the bypass filter, and sealingly connecting the full flow inlet of the bypass filter to the outlet of the bypass filter. The wall of the balancing element may also define one or more through holes therein, that respectively form one or more bypass flow inlets to the flow balancing element for receiving the fluid flowing through the bypass filter media. The one or more bypass flow inlets in combination define an equivalent bypass flow restricting orifice, which may be sized to restrict the flow through the bypass filter media to a desired bypass flow portion of a total inlet flow of fluid to the filter apparatus. The wall of the balancing element may also include a section thereof that forms a full flow restrictor which may be sized to restrict the flow through the full flow media to a desired full flow portion of the total inlet flow of fluid to the filter apparatus. The section of the wall of the balancing element forming the full flow restrictor may also define at least one of the bypass flow inlets.

A filter apparatus, according to the invention, may also include a baseplate and spacer apparatus operatively attached between the open end of the housing and the upper end plate of the bypass filter, for positioning the bypass and full flow filters within the housing, adapting the filter apparatus for spin-on attachment to a filter mounting structure, and defining a filter inlet of the filter apparatus. The baseplate may include an annular wall defining an upper edge and a lower edge of the baseplate, with the upper edge of the baseplate being joined to the open end of filter housing. The spacer may include an annular wall defining an upper and a lower end of the spacer, with the spacer extending between the lower edge of the base plate and the bypass filter element, with the upper end of the spacer, and the lower edge of the base plate being configured to form corresponding mating surfaces, that prevent fluid from flowing past the lower edge of the base plate. The annular wall of the baseplate may be imperforate, and the annular wall of the spacer may define one or more inlet flow passageways that provide fluid communication between inside and outside surfaces of the base plate and spacer.

The invention may also take the form of a method for filtering a fluid, using a filter apparatus according to the invention.

Other aspects, objectives and advantages of the invention will be apparent from the following detailed description and the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
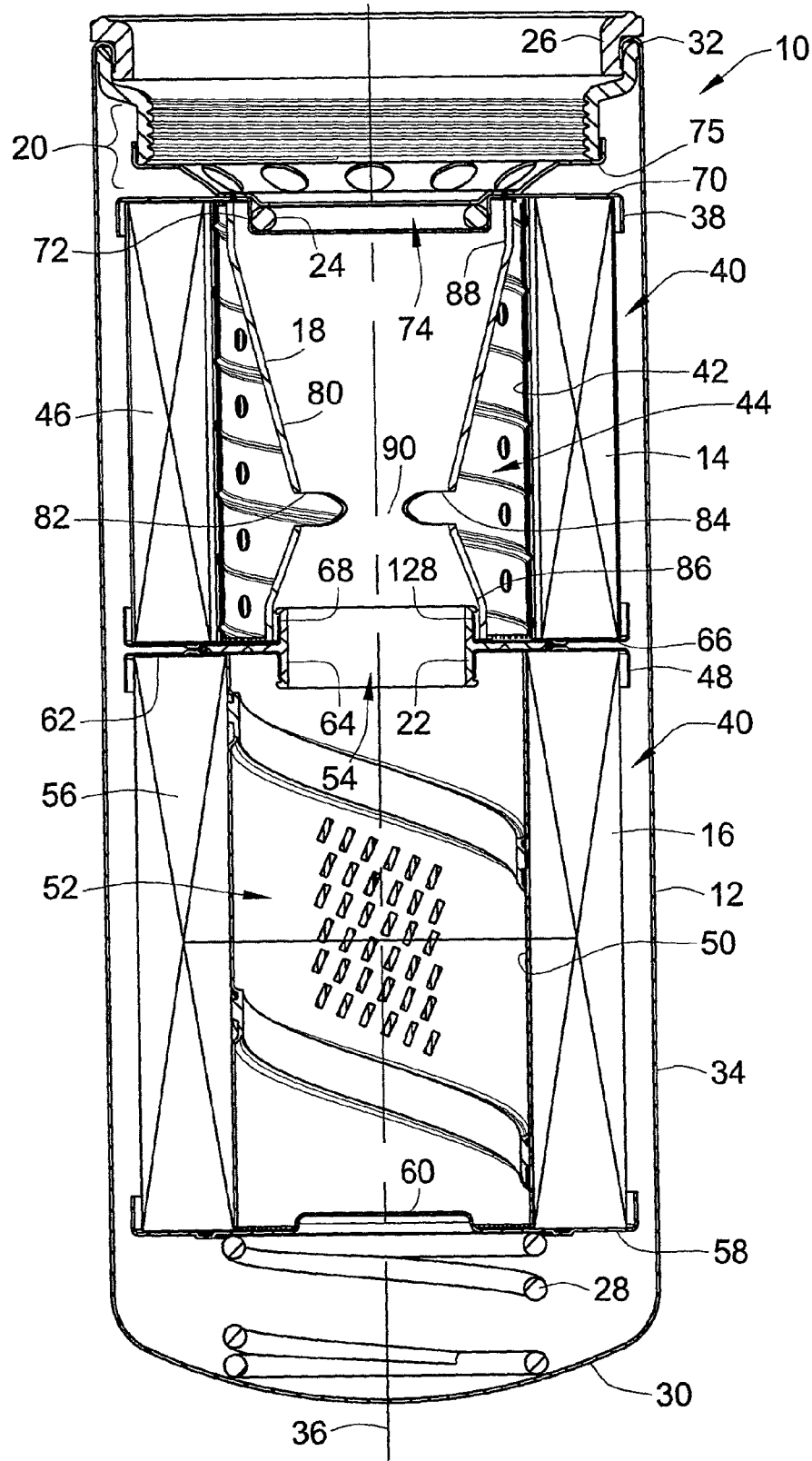
FIG. 1 is a cross section of a first exemplary embodiment of a filter apparatus, according to the invention.
Figure 2:
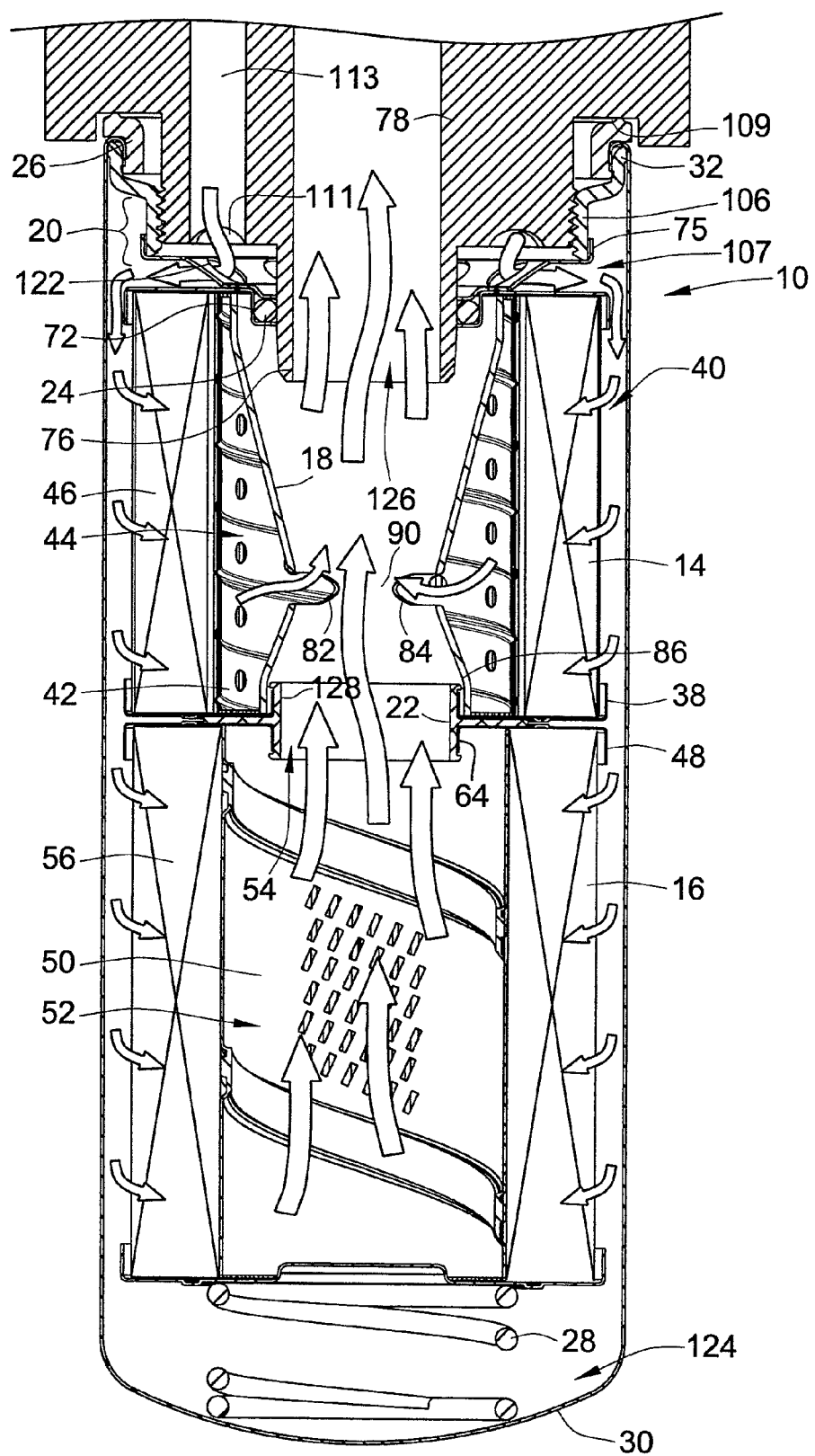
FIG. 2 is a cross section representation of the first exemplary embodiment of FIG. 1, installed on a filter mounting adapter, and having arrows superimposed to illustrate the manner in which fluid flows through the filter apparatus.
Figure 3:
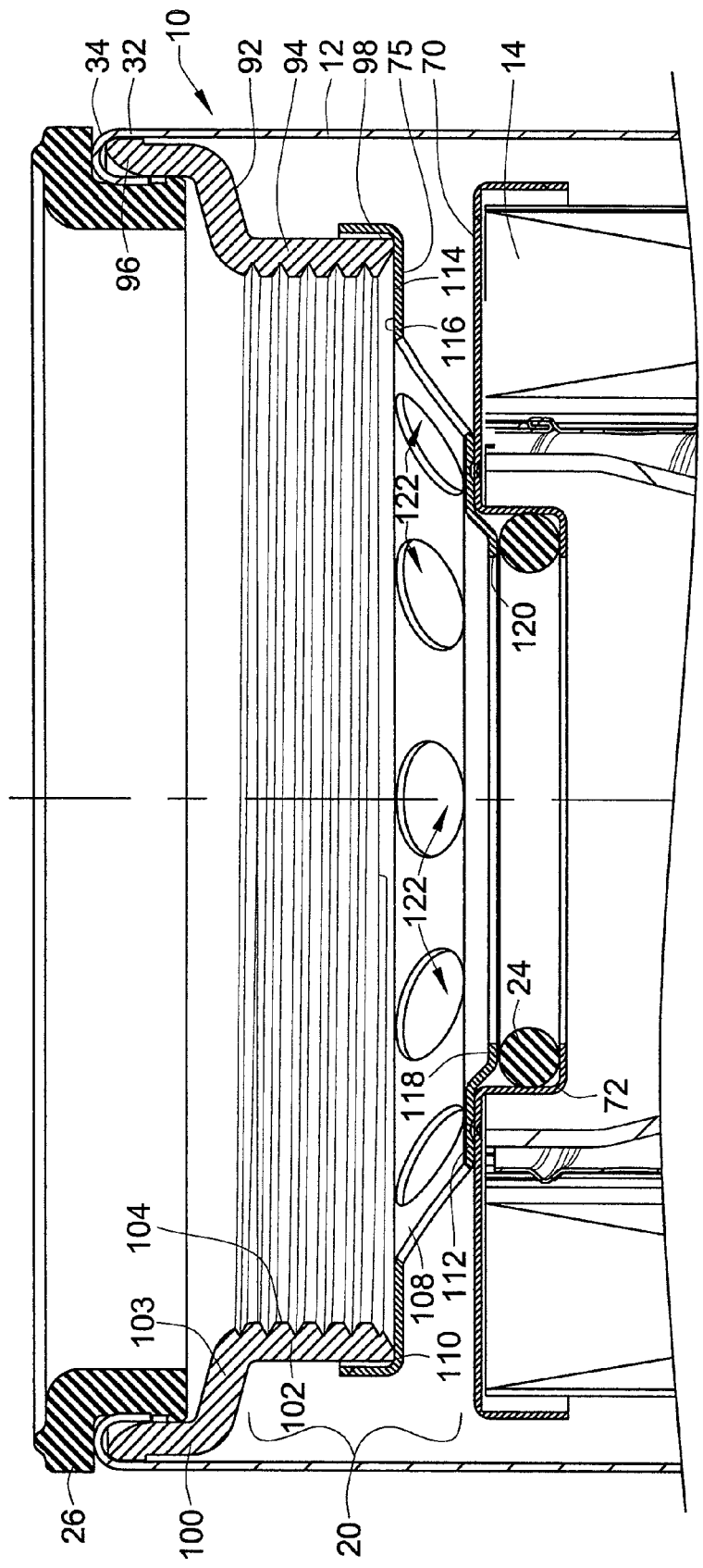
FIG. 3 is an enlarged partial cross section of the first exemplary embodiment of FIGS. 1 and 2, showing an exemplary embodiment of a baseplate and spacer apparatus, according to the invention.

FIGS. 1 through 3 show a first exemplary embodiment of a filter apparatus, according to the invention, in the form of a spin-on filter 10. As shown in FIG. 1, the spin on filter 10 includes, a housing 12, enclosing a bypass filter 14, a full flow filter 16, a flow balancing element 18, a baseplate and spacer apparatus 20, an intermediate seal 22, an outlet seal 24, an inlet seal 26, and a helical compression spring 28. In general, FIGS. 1 and 3 show structural details of the exemplary embodiment of the spin-on filter 10, and FIG. 2 shows the manner in which fluid flows through the exemplary embodiment of the spin-on filter 10.

The housing 12 has a closed end 30 and an open end 32, joined by a cylindrical sidewall 34 defining a longitudinal axis 36 extending from the closed end 30 to the open end 32 of the housing 12.

The bypass filter 14 is disposed within the housing 12 at a point along the longitudinal axis 36 adjacent the open end 32 of the housing 12. The bypass filter 14 has an outer periphery 38 that is spaced inward from the sidewall 34 of the housing 12, to form a space 40 around the bypass filter 14, for passage of fluid between the bypass filter 14 and the sidewall 34. The bypass filter 14 also has an inner periphery 42 forming an axially oriented through-bore 44 of the bypass filter 14, which is centered about the longitudinal axis 36. A bypass filter media 46 is disposed between the inner and outer peripheries 42, 38 of the bypass filter 14. The bypass filter media 46 has a rated bypass filter efficiency, for removing particles of a given size from a fluid flowing radially inward through the bypass filter media 46, from the space 40 around the bypass filter 14 to the central through-bore 42 of the bypass filter 14.

The full flow filter 16 is disposed within the housing 12, adjacent the closed end 30, and has an outer periphery 48 that is spaced inward from the sidewall 34 of the housing 12, to form a continuation of the space 40 around the bypass filter 14 and to thereby provide a space 40 around the full flow filter 16, for passage of fluid between the full flow filter 16 and the sidewall 34 of the housing 12. The space 40 between the full flow filter 16 and the sidewall 34 is connected in sealed fluid communication with the space 40 between the bypass filter 14 and the sidewall 34 of the housing 12, by the sidewall 34 of the housing 12 in conjunction with other elements of the spin-on filter 10, in a manner that will be understood from the following description and an examination of the drawings.

The full flow filter 16 also has an inner periphery 50 thereof forming an axially oriented through-bore 52 of the full flow filter 16. The through bore 52 of the full flow filter 16 is connected in sealed fluid communication with the through-bore 44 of the bypass filter 14 by an opening 54 the intermediate seal 22, when the intermediate seal 22 is sandwiched between the bypass and full flow filters 14, 16, in the manner shown in FIGS. 1 and 2. The full flow filter 16 further includes a full flow filter media 56 is disposed between the inner and outer peripheries 50, 48 of the full flow filter 16, and has a rated full flow filter efficiency, for removing particles of the given size from a fluid flowing radially inward through the full flow filter media 56 from the annular space 40 around the full flow filter 16 to the through-bore 44 of the full flow filter 16, with the full flow filter efficiency being higher than the bypass filter efficiency for removing particles of the given size.

The flow balancing element 18 is disposed within the through-bore 44 of the bypass filter 16 for balancing the flows of fluid through the bypass filter 14 and full flow filter 16.

The full flow filter 16 includes a lower end plate 58 thereof, adjacent the closed end 30 of the housing 12. The lower end plate 58 is attached to the lower end (as shown in the drawings) of the full flow media 56, and extends generally from the outer periphery 48 to the inner periphery 50 of the full flow filter 16. The lower end plate 58 also includes an imperforate center section 60 thereof, which blocks fluid flow from entering the through-bore 52 of the full flow filter 16. The full flow filter 16 also includes an upper end plate 62 thereof, attached to the upper end of the full flow filter media 56 adjacent the bypass filter 14, extending generally inward from the outer periphery 48 of the full flow filter 16, and terminating in a centrally located, annular collar, defining an outlet 64 of the through-bore 52 of the full flow filter 16.

The bypass filter 14 includes a lower end plate 66 thereof, attached to the lower end of the bypass filter media adjacent the upper end plate 62 of the full flow filter 16, extending generally inward from the outer periphery 38 of the bypass filter 14 and terminating in a centrally located annular collar that defines a full flow inlet 68 of the bypass filter 14 The juncture between the through-bores 52, 44 in the full flow and bypass filters 16, 14 is sealed by the intermediate seal 22, which is clamped between the upper end plate 62 of the full flow filter 16, and the lower end plate 66 of the bypass filter 14. The intermediate seal 22 also engages the collars around the outlet 64 of the full flow filter 16 and the full flow inlet 68 of the bypass filter 14, to provide sealed fluid communication between the outlet 64 of the full flow filter 16 and the full flow inlet 68 of the bypass filter 14, through the opening 54 in the intermediate seal 22.

The bypass filter 14 also includes an upper end plate 70 thereof, attached to the end of the bypass filter media 46 adjacent the open end 32 of the housing 12. The upper end plate 70 of the bypass filter 14 extends generally inward from the outer periphery 38 of the bypass filter 14 and terminates in an annular cup 72, having a hole in the bottom thereof that defines an outlet 74 of the through-bore 44 of the bypass filter 14. The outlet 74 of the through-bore 44 of the bypass filter 14 also serves as the filter outlet for the exemplary embodiments of the spin-on filter 10 disclosed herein.

As shown in FIGS. 1 and 2, the outlet seal 24 is mounted in the annular cup 72, and is held in place by a spacer 75 of the baseplate and spacer apparatus 20, in a manner described in more detail below. As shown in FIG. 2, the outlet seal 24 is positioned by the annular cup 72 to seal against an outlet tube 76 extending from a filter mounting adapter 78, when the spin-on filter 10 is installed on the mounting adapter 78.

As shown in FIG. 1, the flow balancing element 18, in the first exemplary embodiment, includes a generally imperforate wall 80 thereof, that is spaced from the inner periphery 42 of the bypass filter 14 and extends between the lower and upper end plates 66, 70 of the bypass filter 14. The ends of the wall 80 are sealingly connected to the full flow inlet 68 of the bypass filter 14 to the outlet 74 of the through bore 44 of the bypass filter 14. The generally imperforate wall 80 of the flow balancing element 18 also defines a pair of through-holes therein, that respectively form a pair of bypass flow inlets 82, 84 to the flow balancing element 18 for receiving fluid flowing through the bypass filter media 46, and into the through-bore 44 of the bypass filter 14. The two bypass flow inlets 82, 84, in combination, define an equivalent bypass flow restricting orifice of the flow balancing apparatus 18, which is sized to restrict fluid flow through the bypass filter media 46 to a desired bypass flow portion of a total inlet flow of fluid to the filter apparatus 10.

The flow balancing element 18 also includes a full flow inlet 86 thereof, that mates with and receives fluid from the full flow inlet 68 of the bypass filter 14. The flow balancing element 18 further includes an outlet 88 that mates with the outlet 74 of the through-bore 44 of the bypass filter 14.

An annular section 90 of the imperforate wall 80 of the flow balancing element 18, disposed about the bypass flow inlets 82, 84 of the flow balancing element 18, defines a full flow restrictor 90. The full flow restrictor 90 is sized to restrict the portion of fluid flowing through the full flow media 56 and into the full flow inlets 68, 86 of the bypass filter 14 and flow balancing element 18, to a desired full flow portion of a total inlet flow of fluid to the filter apparatus 10.

As best seen in FIG. 3, the baseplate and spacer apparatus 20, of the spin-on filter 10, includes a baseplate 92 and the spacer 75. The baseplate and spacer apparatus 20 is operatively attached between the open end 32 of the housing 12 and the upper end plate 70 of the bypass filter 14 and performs several functions including positioning the bypass and full flow filters 14, 16 within the housing 12, adapting the filter apparatus 10 for spin-on attachment to the filter mounting adapter 78, and defining a filter inlet of the filter apparatus 10, in a manner described in more detail below.

The base plate 92, in the exemplary embodiment, includes an annular wall 94 defining an upper edge 96 and a lower edge 98 of the baseplate 92, with the upper edge 96 of the baseplate 92 being joined to the open end 32 of filter housing 12. In the exemplary embodiment, a portion of the sidewall 34 of the housing 12, adjacent the open end 32 of the housing 12, is formed over the upper edge 96 of the baseplate 92, to thereby join the baseplate 92 to the housing 12 with a so-called "J-lock" connection. In other embodiments of the invention, however, the baseplate 92 may be joined to the open end 32 of the housing 12 by other types of connections.

The annular wall 94 of the baseplate 92 of the exemplary embodiment is also imperforate, but the baseplates of other embodiments of the invention may include holes for the passage of fluid. The annular wall 94 in the exemplary embodiment includes a first, a second, and a third wall section 100, 102, 103. The first wall section 100 includes the upper edge 96 of the baseplate 92, and has an outer diameter that is generally equal to an inner diameter of the sidewall 34 of the housing 12. The second wall section 102 has an inner surface that is somewhat smaller in diameter than the outer diameter of the first wall section 100, and includes female threads 104 for engagement with mating male threads 106 on the filter mounting adapter 78, for attaching the spin-on filter 10 to the filter mounting adapter 78 in the manner shown in FIG. 2. As shown in FIG. 3, the first and second sections 100, 102 of the annular wall 94 of the baseplate 92 are joined by the third wall section 103.

The inlet seal 26 seals the juncture of the open end 32 of the housing 12 with a seal surface 109 of the filter mounting adapter 78, as shown in FIG. 2, when the spin-on filter 10 is attached to the mounting adapter 78. When the spin-on filter 10 is properly tightened onto the threads 106 of the mounting adapter 78, the inlet seal 26 and the outlet seal 24, in conjunction with elements of the mounting adapter 78 and components of the filter 10 form an inlet plenum 107, for directing a flow of fluid, supplied via an annular groove 111 in the mounting adapter 78 that is attached to an inlet passage 113 of the mounting adapter 78, in the manner shown in FIG. 2

The spacer 75, in the exemplary embodiment, includes an annular wall 108 extending between the lower edge 98 of the base plate and the upper end plate 70 of bypass filter 14, and defining an upper and a lower end 110, 112 of the spacer 75. The upper end 110 of the spacer 75, and the lower edge 98 of the base plate 75 are configured to form corresponding mating surfaces 114, 116, of the baseplate 92 and the spacer 75 respectively, which fit together tightly enough to prevent fluid from flowing between the mating surfaces 114, 116 and past the lower edge 98 of the base plate 92.

The lower end 112 of the spacer 75 is attached to the upper end plate 70 of the bypass filter 14, and defines an annular flange 118 that protrudes into the annular cup 72 in the upper end plate 70 of the bypass filter 14, for retaining the outlet seal 24 within the annular cup 72. The annular flange 118 forms a hole 120 in the lower end 112 of the spacer 75, for passage therethrough of the outlet tube 76 of the filter mounting adapter 78.

The annular wall 108 of the exemplary embodiment of the spacer 75 also defines a plurality of circumferentially spaced inlet flow passageways 122 that provide fluid communication between inside and outside surfaces of the baseplate 92 and spacer 75. The inlet flow passageways 122 in the spacer 75, in combination, define a filter inlet that allows fluid to flow from the inlet groove 111 in the mounting adapter 78 into the filter housing 12. In other embodiments of the invention, however, the annular wall 108 of the spacer 75 may be imperforate, and other provisions made for allowing entry fluid into the filter housing 12.

The spring 28 of the filter apparatus 10 is compressed between the closed end 30 of the housing 12, and the lower end plate 58 of the full flow filter, to provide an axially directed force for axially positioning the bypass and full flow filters 14, 16, with respect to the baseplate and spacer apparatus 20, and to maintain the seal between the bypass and full flow filters 14, 16 provided by the intermediate seal 22.

By virtue of the construction described above, the spin-on filter 10 can be installed on the mounting adapter 78, as described above, and operated in the manner illustrated by a number of illustrative arrows, indicating fluid flow, in FIG. 2.

A total inlet flow of fluid to be filtered is supplied to the spin-on filter 10 by the inlet passage 113 in the mounting adapter 78, via the annular groove 111 of the mounting adapter 78. The total inlet flow enters into the inlet plenum area 107, from the annular groove 111 in the mounting adapter 78, and flows through the passageways 122 in the spacer 75 into the space 40 between the sidewall 34 of the housing 12 and the outer peripheries 38, 48 of the bypass and full flow filters 14, 16. The incoming fluid also flows into and fills the space 124 adjacent the closed end 30 of the housing 12, around the spring 28, between the lower end plate 58 of the full flow filter 16 and the closed end 30 of the housing 12, so that the entire volume within the housing 12 and outside of the bypass and full flow filters 14, 16 is filled with the incoming fluid to be filtered.

As shown in FIG. 2, the inner peripheries 42, 50 of the bypass and full flow filters 14, 16 are perforated to allow the incoming fluid to flow radially inward through the medias 46, 56 of the bypass and full flow filters 14, 16 from the space 40, around the outer peripheries 38, 48 of the bypass and full flow filters 14, 16, into the through bores 44, 52 of the bypass and full flow filters 14, 16. The portion of the fluid passing through the full flow filter 16, exits the through-bore 52 of the full flow filter 16 through the outlet 64 of the full flow filter 16, and enters the full flow inlet 86 of the flow balancing element. The portion of the fluid passing through the bypass filter 14, exits the through-bore 44 of the bypass filter 14, by flowing through the bypass flow inlets 82, 84 in the flow balancing element 18. The combined portions of flow passing through the full flow filter 16 and the bypass filter 14 are then joined into a common total outlet flow of filtered fluid, that exits the spin-on filter 10 through a bore 126 in the outlet tube 76.

The proportions of the total inlet flow that pass through each of the bypass and full flow filters 14, 16 is primarily determined by the size of the bypass flow inlets 82, 84 and the flow restrictor 90 of the flow balancing element 18, in conjunction with the operating characteristics of the medias 46, 56 of the bypass and full flow filters 14, 16.

In the exemplary embodiment of the spin on filter 10, as described above, these components and features are selected in such a manner that, at a predetermined operating temperature, the portion of flow through full flow filter is approximately 75 percent of the total inlet flow, and the portion of flow through the bypass filter is approximately 25 percent. At cold temperatures, such as might be experienced by an engine lubrication system immediately upon starting the engine and until the engine warms up, and particularly where the temperature of the fluid is well below the operating temperature, most of the total inlet flow will pass through the bypass filter 14 rather than the full flow filter 16. As the fluid warms up toward the operating temperature, the portions of flow passing respectively through the bypass and full flow filters will change proportionately, with the desired 25 percent bypass/75 percent full flow proportioning being established when operating temperature is reached.

Specifically, in the exemplary embodiment of the spin-on filter 10, the bypass media was selected to be 35% efficient at removing particles that are 10 microns in size, and the full flow filter media was selected to be 85% efficient at removing particles that are 10 microns in size. The bypass flow inlets 82, 84 in the flow balancing element, and the flow restrictor 90 of the flow balancing element 18 were then selected, through calculation and experimentation, to provide the desired division of the total inlet flow into the desired approximately 75 percent full flow portion and approximately 25 percent bypass portions of the total inlet flow, at operating temperature.

The media efficiency ratings and desired proportions of the total inlet flow, described above in relation to the exemplary embodiment of the spin-on filter 10, together with the particular configuration and arrangement of the components in the exemplary embodiment of the spin-on filter 10, were judiciously and purposefully selected to provide a filter apparatus having lower resistance to fluid flow during cold-start operation than prior spin-on filter of this type, and to provide a larger capacity for holding removed contaminants than prior spin-on filters of this type, while still providing a high overall filtering efficiency. Having a lower resistance to fluid flow during cold-start operation, is advantageous in that, for an engine lubrication system, for example, better lubrication can be provided to the engine during cold-start operation. Having a higher capacity for holding removed contaminant is advantageous in that the interval between filter changes can be lengthened, thereby reducing operational costs for the system protected by the filter apparatus.

Those skilled in the art will recognize, however, that in other embodiments of the invention it may be desirable to utilize bypass and full flow medias having different efficiency ratings and/or change the configuration of the flow balancing element, or other components of the filter apparatus, to achieve different proportioning of the inlet fluid between the bypass and full flow filters.

It should be noted that, although the shape of the wall 80 of the flow balancing element, in the exemplary embodiment described above, resembles a convergent/divergent nozzle, or the venturi tubes used in prior filters, the flow balancing element 18 of the present invention is both structurally and functionally very differently from such devices. The flow balancing element 18 of the present invention does not need to produce a lower pressure, to induce flow through the bypass filter, as was the case with venturis in prior filters having both a bypass and a full flow filtering element. The annular section of the wall 80 of the flow restrictor 18, which forms the full flow restrictor 90 of the exemplary embodiment of the invention described above, does not restrict the flow through the flow balancing element 18 to a point that a significant reduction in pressure occurs at the flow restrictor 90.

As will be seen from an examination of FIGS. 1 and 2, the minimum diameter of the wall 80, at the flow restrictor 90, is approximately the same as the diameters of the inside surface 128 of the opening 54 in the intermediate seal 22, and the bore 126 in the outlet tube 76 of the mounting adapter 78. In order for the flow through the flow restrictor 90 to be accelerated to a degree significant enough to produce appreciable pressure drop at the bypass flow inlets 82, 84, the full flow restrictor 90 would have to be considerably smaller in diameter than the diameters of the through hole in the intermediate seal 22 and the bore of the outlet tube 76. In fact, in other embodiments of the invention, the full flow restrictor 90 may be separated from the bypass flow inlets 82, 84, and might alternatively be provided by judicious sizing of the opening 54 in the intermediate seal 22, the outlet 64 of the full flow filter 16, the full flow inlet 68 of the bypass filter 14, or other features located upstream from the bypass flow inlets 82, 84. The bypass flow inlets may also have a very different configuration.

In the exemplary embodiment of the spin-on filter 10, shown in FIGS. 1-3, the annular wall 80 of the flow balancing element 18 has a conical shape on either side of the bypass flow inlets 82, 84. This shape was selected for packaging reasons, to facilitate making connections to mating parts, and to form an outer surface that would direct and provide a smooth transition for the bypass portion of the fluid, as it changes direction from radial to axial, while moving along the outside of the wall 80 in the through bore 44 of the bypass filter 14, prior to entering the bypass flow inlets 82, 84 in the flow balancing element 18.

Figure 4:
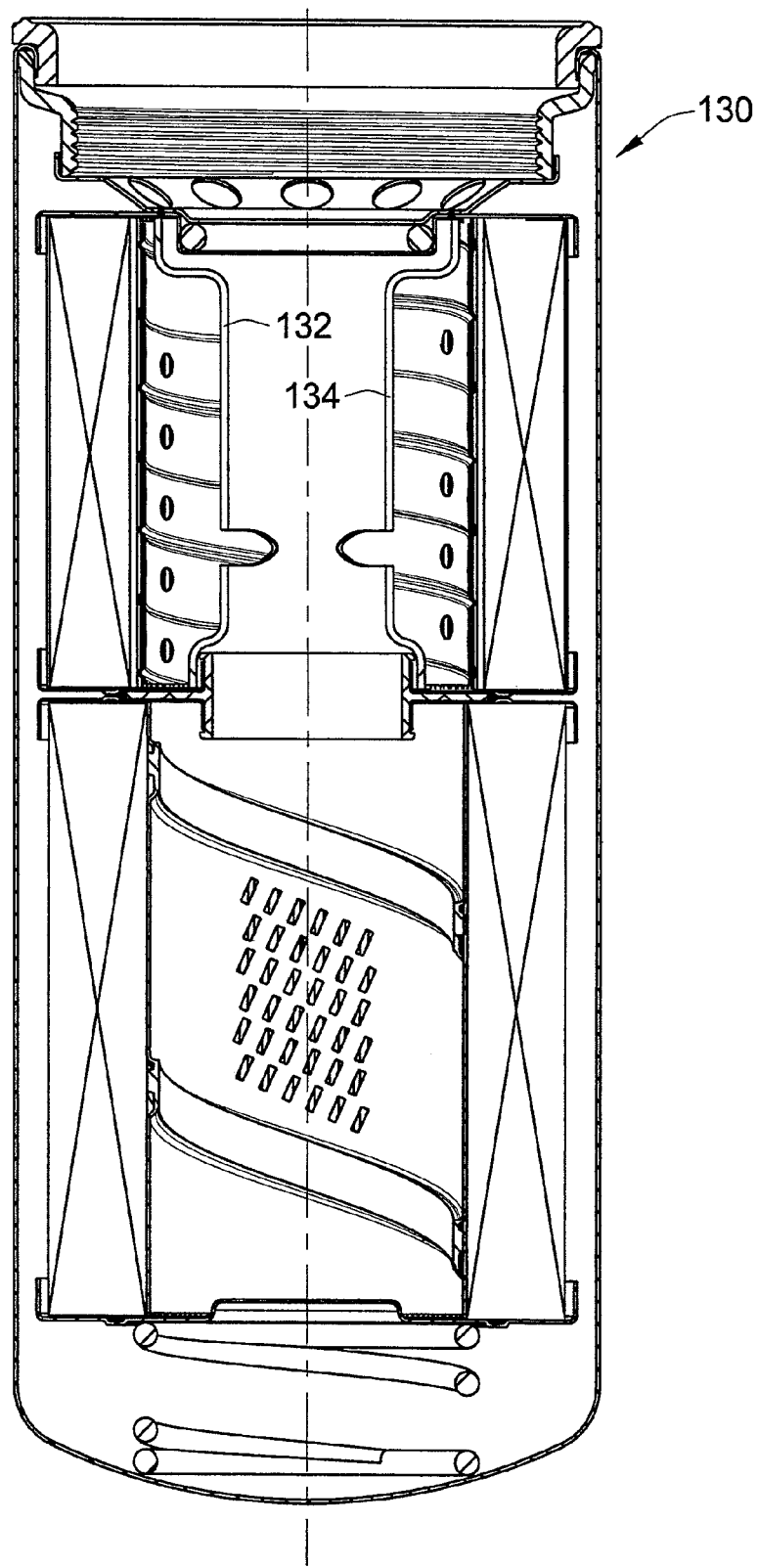
FIG. 4 is a cross sectional view, of a second exemplary embodiment of the invention that is essentially identical to the first exemplary embodiment shown in FIGS. 1-3, except that a flow balancing element of the second exemplary embodiment is of a different shape than a corresponding flow balancing element of the first exemplary embodiment.

To further emphasize this point, FIG. 4 shows a second exemplary embodiment of a spin-on filter 130, according to the invention, which is essentially identical, structurally and functionally, to the previously described spin-on filter 10, except that the flow balancing element 18 of the first exemplary embodiment, having conical sections of the wall 80, is replaced, in the second exemplary embodiment, with a flow balancing element 132 having a straight-sided annular wall 134. The inner diameter of the straight-sided wall 134, in the flow balancing element 132 of the second embodiment, is equal to the minimum diameter of the full flow restrictor 90 of the first embodiment. The entire inner surface 134 of the flow balancing element 132, in the second embodiment, therefore, functions as the full flow restrictor in the second embodiment.

From the disclosure provided herein, those having skill in the art will recognize that an apparatus or method, according to the invention, provides significant advantages in manufacturability and functionality, as compared to prior filters having a bypass element, a full flow element and a venturi tube for inducing flow through the bypass filter. It has also been found, that in a filter apparatus according to the invention, the filter media tends to be loaded more evenly with contaminants during its life. This results in the media of a filter apparatus according to the invention being able to hold more contaminant, before the filter needs to be replaced, thereby reducing operating costs of the system being served by the filter apparatus by reducing the frequency with which the filter apparatus needs to be replaced.

Those having skill in the art will also recognize that, although invention has been described herein with reference to several exemplary embodiments, many other embodiments of the invention are possible. For example, although it is not necessary in practicing the invention to have the flow balancing element include a venturi, it is contemplated within the scope of the claimed invention that a flow balancing element in other embodiments of the invention might include a venturi.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid filter apparatus, comprising:
    a housing defining an open end;
    a filter disposed within the housing; and
    a base plate and spacer apparatus operatively attached between the open end of the housing and the filter, for positioning the filter within the housing, adapting the filter apparatus for spin-on attachment to a filter mounting structure, and defining a filter inlet of the filter apparatus, the base plate and spacer apparatus including:
    a base plate having an imperforate annular wall defining an upper edge and a lower edge of the base plate, the upper edge of the base plate being operatively joined to the open end of filter housing; and
    a spacer including an annular wall defining an upper and lower end of the spacer, with the spacer extending between the lower edge of the base plate and the filter, the annular wall of the spacer defining one or more inlet flow passageways that provide fluid communication between inside and outside surfaces of the base plate and spacer, the lower end of the spacer is attached to the filter, the spacer is clamped against the base plate by a spring operatively connected to the housing;
    the upper end of the spacer, and the lower edge of the base plate being configured to form corresponding mating surfaces, preventing fluid from flowing between the lower edge of the base plate and the upper end of the spacer.

2. The filter apparatus of claim 1 wherein the upper edge of the base plate has an outer diameter.

3. The filter apparatus of claim 2 wherein the housing includes a sidewall, the sidewall includes an inner diameter, the outer diameter of the base plate is generally equal to the inner diameter of the sidewall.

4. The filter apparatus of claim 2 wherein the base plate includes threads.

5. The filter apparatus of claim 1 wherein the mating surfaces are continuous.

6. The filter apparatus of claim 1 wherein the base plate is joined to the housing by forming the open end of the housing over the upper edge of the base plate.

7. The filter apparatus of claim 1 wherein the lower end of the spacer includes a flange, the filter includes a cup, an outlet seal is located in the cup, the outlet seal is retained in the cup by the flange.

8. The filter apparatus of claim 1 wherein the flow passageways are circumferentially spaced.

9. The filter apparatus of claim 1 wherein the one or more flow passageways are holes.

10. The filter apparatus of claim 9 wherein the one or more flow passageways are circular.

11. A fluid filter apparatus, comprising:
a housing defining an open end;
a filter disposed within the housing; and
a base plate and spacer apparatus operatively attached between the open end of the housing and the filter, for positioning the filter within the housing, adapting the filter apparatus for spin-on attachment to a filter mounting structure, and defining a filter inlet of the filter apparatus, the base plate and spacer apparatus including:
a base plate having an imperforate annular wall defining an upper edge and a lower edge of the base plate, the upper edge of the base plate being operatively joined to the open end of filter housing; and
the base plate includes a first wall section, a second wall section, and a third wall section; the first wall section is connected to the third wall section, the third wall section connected to the second wall section, the first wall section extends axially, the second wall section extends axially, the third wall section extends axially and radially from the first wall section to the second wall section,
a spacer including an annular wall defining an upper and lower end of the spacer, with the spacer extending between the lower edge of the base plate and the filter, the annular wall of the spacer defining one or more inlet flow passageways that provide fluid communication between inside and outside surfaces of the base plate and spacer, the lower end of the spacer is attached to the filter, the spacer is clamped against the base plate by a spring operatively connected to the housing;
the upper end of the spacer, and the lower edge of the base plate being configured to form corresponding mating surfaces, preventing fluid from flowing between the lower edge of the base plate and the upper end of the spacer.

12. The filter apparatus of claim 11 wherein the upper edge of the base plate has an outer diameter.

13. The filter apparatus of claim 12 wherein the housing includes a sidewall, the sidewall includes an inner diameter, the outer diameter of the base plate is generally equal to the inner diameter of the sidewall.

14. The filter apparatus of claim 12 wherein the second wall section includes an inner surface that is smaller in diameter than the outer diameter of the upper edge.

15. The filter apparatus of claim 12 wherein the second wall section includes threads.

16. The filter apparatus of claim 11 wherein the mating surfaces are continuous.

17. The filter apparatus of claim 11 wherein the base plate is joined to the housing by forming the open end of the housing over the upper edge of the base plate.

18. The filter apparatus of claim 11 wherein the lower end of the spacer includes a flange, the filter includes a cup, an outlet seal is located in the cup, the outlet seal is retained in the cup by the flange.

19. The filter apparatus of claim 11 wherein the flow passageways are circumferentially spaced.

20. The filter apparatus of claim 11 wherein the one or more flow passageways are holes.

21. The filter apparatus of claim 20 wherein the one or more flow passageways are circular.

22. A fluid filter apparatus, comprising:
a housing defining an open end;
a filter disposed within the housing; and
a base plate and spacer apparatus operatively attached between the open end of the housing and the filter, for positioning the filter within the housing, adapting the filter apparatus for spin-on attachment to a filter mounting structure, and defining a filter inlet of the filter apparatus, the base plate and spacer apparatus including:
a base plate having an imperforate annular wall defining an upper edge and a lower edge of the base plate, the upper edge of the base plate being operatively joined to the open end of filter housing, the base plate is joined to the housing by forming the open end of the housing over the upper edge of the base plate; and
a spacer including an annular wall defining an upper and lower end of the spacer, with the spacer extending between the lower edge of the base plate and the filter, the annular wall of the spacer defining one or more inlet flow passageways that provide fluid communication between inside and outside surfaces of the base plate and spacer, the lower end of the spacer is attached to the filter, the spacer is clamped against the base plate by a spring operatively connected to the housing;
the upper end of the spacer, and the lower edge of the base plate being configured to form corresponding mating surfaces, preventing fluid from flowing between the lower edge of the base plate and the upper end of the spacer.

23. The filter apparatus of claim 22 wherein the upper edge of the base plate has an outer diameter.

24. The filter apparatus of claim 23 wherein the housing includes a sidewall, the sidewall includes an inner diameter, the outer diameter of the base plate is generally equal to the inner diameter of the sidewall.

25. The filter apparatus of claim 23 wherein the base plate includes threads.

26. The filter apparatus of claim 22 wherein the mating surfaces are continuous.

27. The filter apparatus of claim 22 wherein the lower end of the spacer includes a flange, the filter includes a cup, an outlet seal is located in the cup, the outlet seal is retained in the cup by the flange.

28. The filter apparatus of claim 22 wherein the flow passageways are circumferentially spaced.

29. The filter apparatus of claim 22 wherein the one or more flow passageways are holes.

30. The filter apparatus of claim 29 wherein the one or more flow passageways are circular.

* * * * *